United States Patent [19]

Zimmer

[11] Patent Number: 4,935,597
[45] Date of Patent: Jun. 19, 1990

[54] PROCESS AND A DEVICE FOR FINDING AND FOLLOWING A HOLLOW WELD IN SHIELDED ARC WELDING

[75] Inventor: Ernst Zimmer, Friedberg, Fed. Rep. of Germany

[73] Assignee: Kuka Schweissanlagen & Roboter GmbH, Augsburg, Fed. Rep. of Germany

[21] Appl. No.: 105,174

[22] Filed: Aug. 19, 1987

[51] Int. Cl.$^5$ ............................................. B23K 9/127
[52] U.S. Cl. ............................ 219/124.34; 219/124.02
[58] Field of Search .................. 219/124.34, 124.22, 219/124.02, 124.03

[56] References Cited

U.S. PATENT DOCUMENTS

| | | | |
|---|---|---|---|
| 4,249,062 | 2/1981 | Hozumi et al. | 219/124.34 |
| 4,389,561 | 6/1983 | Weman et al. | 219/124.34 |
| 4,525,619 | 6/1985 | Ide et al. | 219/124.22 |
| 4,540,869 | 9/1985 | Yasuoka | 219/124.34 |
| 4,636,610 | 1/1987 | Kamo et al. | 219/124.02 |

*Primary Examiner*—Clifford C. Shaw
*Attorney, Agent, or Firm*—McGlew & Tuttle

[57] ABSTRACT

The invention concerns a process and a device for seeking and following a hollow weld during a shielded arc welding, especially welding with carbon dioxide gas. The welding torch is moved by a path-controlled manipulator, whereby prior to the welding the positional coordinates of one or more weld reference point of the hollow weld are found by mechanical contour probing and the actual position of the hollow weld found therefrom is saved in the path control. The lengthwise guidance is then done only through the appropriately corrected path control, only the height of the welding torch above the toe of the weld being adjusted in dependence on the welding current. The mechanical contour probing is done by contact sensing of the sides of the weld adjacent to the weld reference point, and the coordinates of the weld root point are computed from these data. For this purpose, the welding torch can swivel in its mounting and is provided with a switching disc which lifts away upon contact with the weld sides by deflection of the welding torch and sends a switching signal.

9 Claims, 1 Drawing Sheet

PROCESS AND A DEVICE FOR FINDING AND FOLLOWING A HOLLOW WELD IN SHIELDED ARC WELDING

FIELD AND BACKGROUND OF THE INVENTION

This invention relates in general to welding and in particular to a new and useful method and apparatus for finding and following a fillet weld in a shielded arc welding process.

To control the welding torch when seeking and following a fillet weld, it is customary to employ to so-called back and forth control, whereby the welding torch tube swings across the lengthwise axis of the weld at a predetermined frequency and through a predetermined angle. In this way, the magnitude of the welding current is measured and then the vertical and horizontal position of the torch is corrected. Back and forth control has the disadvantage that it only works with high-quality gas blends as the shielding gas. If carbon dioxide is used for this purpose, instability of the arc results, which varies continually between spray arc, long arc, and short arc, as well as short circuit. Under these conditions, the current signal during the measurement of the sides of the weld can no longer be evaluated with the necessary accuracy and reliability at the end of the swinging motion, so that the torch is no longer guided with certainty down the middle of the fillet weld.

SUMMARY OF THE INVENTION

The present invention provides a simple and operationally reliable method and apparatus for finding and following a hollow weld, even when using carbon dioxide as the inert gas.

In the path control of the manipulator, a guidance path corresponding to the line of the weld is programmed in advance. The line of the weld can be straight over its length, or comprised of several straight weld segments in the form of a polygon. During the welding, the torch is moved along this guidance path and thus along the hollow fillet area.

Because of positional uncertainties of the workpiece, the actual position of the fillet weld may differ from the previously programmed position of the guidance path. By mechanical sensing of the contour at one or more reference points of the weld, the actual position of the fillet weld is ascertained and the previously programmed guidance path is accordingly changed with its coordinates. The number of reference points of the weld depends on the possible deviations of the fillet weld from its nominal position, the complexity of the tract of the weld, and the length of the weld area. If the deviation from the nominal position is only in a sideways, parallel translation, it is sufficient to ascertain one reference point of the weld, since the direction of the weld is not affected. But if the positional errors are two- or multidimensional, two, or even more, reference points must be ascertained between which the course of the weld remains a straight line. If the hollow weld is in the form of a polygon, reference points are found at the corners.

During the welding, the torch is moved along the previously programmed and corrected guidance path, its height being adjusted by a control depending on the welding current. Thus it is possible to trace a hollow weld which, although straight in lengthwise direction, may vary in the shape of a curve along the vertical, for example. Furthermore, inaccuracies at the toe of the weld are compensated by the height adjustment.

Since a to and fro motion is not needed to follow the weld, the measured current values are continuously available for control of the height. Superimposed perturbations (such as short circuits) are not so significant now, and can be suppressed, which is tantamount to an averaging process.

The magnitude of the welding current must vary within a predetermined region: transgression of the upper of lower limit signifies that the torch is too close or too far from the toe of the weld. The torch is then adjusted to the proper height by the height control.

A particularly simple possibility of the weld is to sense mechanical sensing of the sides of the elements to be welded to determine the reference points results when while using the welding torch itself as the sensor. Upon making contact with the side of the element to be welded, the torch is deflected from its nominal position, thereby activating a switch. In response to this signal, the path control saves the 3-dimensional coordinates of the reference point. In the same fashion, the reference point on the other side of the weld is found. Since the angle of the sides of the elements to be welded negligible tolerances and can therefore be taken as constant, the position of the root of the weld can be calculated from the ascertained coordinates and the slope of the sides. The root point of the weld or another point of the weld, always found in the identical geometrical manner, can be used as the reference point of the weld. It is especially convenient to use, as the reference point, the starting point of the welding, representing the initial point of the guidance path. For this, the distance from the root point of the weld and the sideways displacement are calculated, which may be different in the case of different weld forms or weld positions in multilayer welding.

Use of the welding torch tube as the measuring sensor is functionally independent of the height control mentioned. Additionally the declared process and devices can be used with advantage in other weld seeking and following systems, or installed as a modification.

Accordingly it is an object of the invention to provide a method of finding and following a fillet weld in a shielded arc which comprises prior to welding, determining positional coordinates of a plurality of torch welding positions along a weld operational path relative to a contemplated fillet weld, moving the torch through the operational path and sensing when the torch contacts the sides of the elements to be welded, correcting the position of the torch according to the sensed information and sensing the spacing of the torch above the base of the weld as the weld area in being formed as a function of the welding current being required and correcting heights of the torch accordingly.

A further object of the invention is to provide the apparatus for finding and following a hollow weld in a shielded arc welding process which comprises a device for manipulating the welding torch which includes a stabilizing plate or disc upon which the torch is mounted centrally and which is biased at each peripheral end into contact with one or more sensors or contacts and which during the movement of the welding torch is effective to record the position of the welding torch whenever it runs into the sides of the elements to be welded. A further object of the invention is to provide a device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and desscriptive matter in which preferred embodiments of the invention are illustrated.

DESCRIPTION OF THE PREFERRED EMBODIMENTS

Figure 1:
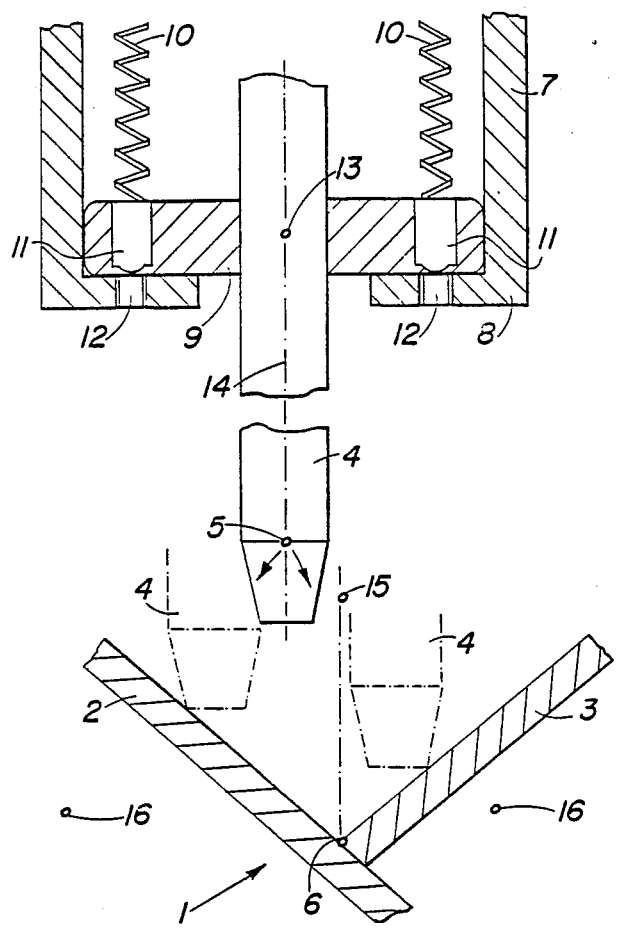
FIG. 1 is a sectional view of a fillet weld showing left and right sides of the elements to be welded having a central root point and in which the welding torch is mounted so as to actuate the positioning sensor as constructed in accordance with the invention.

Referring to the drawings in particular the invention embodied therein comprises an apparatus for seeking and following a fillet weld during shielded arc welding and which includes a hollow fillet weld 1 having a left side elements 2 which intersects a right side elements 3 and forms a welding target having a root point 6 arranged along the starting point center line 15. In accordance with the invention a torch 4 is mounted on a support or disc 9 which is biased by springs 10 on each side into engagement with screws 12 which for example may be made arranged at right angles to the axis of the torch or spaced around the periphery of the disc in the event that many attitudes of the torch are to be observed. The disc is mounted so as to overly flanges 8 of a housing and contact element 11 thereon are arranged in alignment with adjustment screws 12 which may be varied to effect accurate sensor operation of the position of the welding torch.

Figure 2:
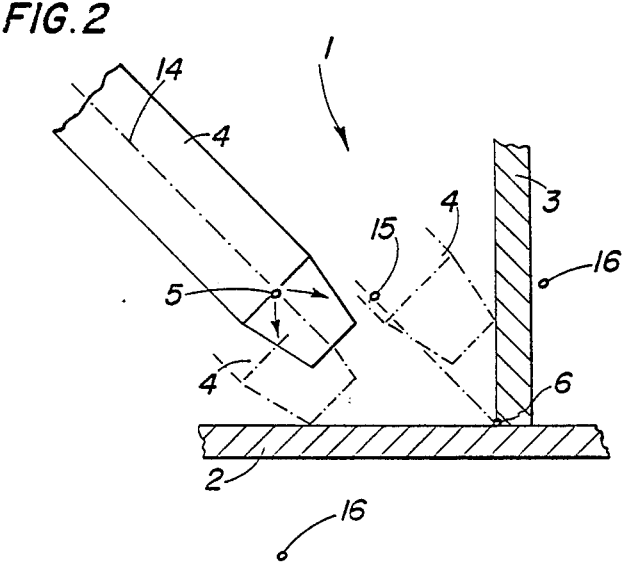
FIG. 2 is a view similar to FIG. 1 of another embodiment of the device.

FIGS. 1 and 2 show in cross section a fillet weld 1 with left and right sides to be welded 2, 3 and weld root point 6. The fillet weld 1 in FIG. 1 is open at the top and has a side angle larger than 90°. FIG. 2 shows a hollow weld open at the side angle of 90°.

The welding torch 4 is part of a welding layout for shielded arc welding, particularly welding with carbon dioxide inert gas. The torch is moved by a multiaxial manipulator, such as a 6-axis or multiaxial industrial robot. The motion follows a path control of the manipulator, in which the straight stretches of the hollow fillet weld 1 are previously programmed as the guidance path in 3-dimensional path coordinates. During the welding, the welding torch tube 4 follows the predetermined guidance path, its height above the base of the weld area being regulated by a torch height control in dependence on the welding current. The root point of the weld 6 is taken as the base of the weld area at the start of the welding, while in the case of multilayer welding the last produced layer is used in this capacity.

In order to avoid collisions between the torch tube 4 and the sides of the weld 2, 3 during welding, the position of the previously programmed guidance path must be coordinated with the actual position of the hollow weld 1. For this, one or more weld reference points characteristic of the actual position of the fillet weld 1 is ascertained. The welding torch 4 is brought to a previously programmed search point 5 above and between the sides of the weld 2, 3. From this point, the torch 4 is moved in a predetermined path to the first to be welded side 2 in the direction of a programmed target point 16. The target point 16 must lie on the sides 2, 3 or beyond. Since the angle of the sides is given and varies only to a negligible degree, the adjustment occurs at a right angle to the predetermined slope of the side. When the torch 4 touches the weld side 2, a switching pulse is sent, causing the path control to save the 3-dimensional coordinates of this point of contact.

Then the torch 4 is moved back to the search point 5, from which it seeks the right side of the weld 3 in the previously described manner and the position of the point of contact is ascertained and saved. In both cases, the adjusting motion of the torch occurs at a right angle to the previously programmed longitudinal direction of the fillet weld 1.

From the coordinates of the points of contact and the predetermined slopes of the sides, the path control computes the position of the root point of the weld as the point of intersection of the sides. The weld root 6 is characteristic of the fillet weld 1 and can be used as a reference point. To the extent that the direction of the hollow weld 1 is subject to tolerances or variation, one or more additional reference points of the weld are found in the described manner. The actual position of the fillet weld 1 is found in terms of the position of one weld reference point and the known invariable direction of the fillet weld 1 or in terms of several reference points. Coordinate transformation then corrects the previously programmed guidance path and adjusts it accordingly.

Prior to the welding, the path control positions the welding torch 4 at the starting point 15, where the torch 4 has the proper sideways and angular orientation with respect to the theoretical fillet weld 1. Each time, the starting point 15 is the point of commencement of the search for the sides 2, 3.

When laying down the first weld, the starting point 15 is situated on the median line of the angle of the weld, passing through the weld root point 6 at a prescribed distance between the sides of the weld 2, 3. This distance should be as short as possible, as the speed of the search from the starting point 15 is greatly reduced and therefore is a timing factor. The longitudinal axis 14 of the torch is lined up with this median line. To make additional welds, the torch 4 can be shifted under a program controlled changing of this starting point 15 or even cocked (re-oriented).

In the welding direction, there is arranged a torch height control (not shown), which has a measuring device for the magnitude of the welding current. A change in height of the welding torch 4 above the fillet weld 1, or an already applied weld layer, is manifested as a change in length of the arc and, thus, a change in the current. If the height is too low, the welding current increases, while if it is too high it decreases. In the torch height control, which can be a component of the path control of the manipulator and is preferable a component of the sensor control coordinated with the source of the welding current, there is a nominal range defined for the welding current, the upper and lower limits of which correspond to the minimum and maximum allowable height of the torch. As soon as the value of the welding current leaves this nominal range, the torch height control adjusts the distance of the welding torch to the nominal dimension.

FIG. 1 shows a device for mechanical contour sensing to ascertain the weld reference points. This device can also be used as a safety disconnect in event of collision, which is reactivated shortly before the welding process, after having been switched off prior to the search process, and which disconnects the manipulator or the welding equipment when the torch 4 makes contact with the weld side 2, 3. For the process of seeking the weld prior to the welding, the safety disconnect function is shorted out.

On the welding torch tube 14 there is secured, for example, a round switching disc 9, in which two or more microswitches 11 are installed, for example, radially opposite each other. The torch tube 4 rests loosely with this switching disc 9 on inwardly projecting flanges 8 of a housing 7. The switching disc 9 is prevented from turning about the longitudinal axis 14 of the torch 4 by a pin (not shown). Furthermore, there are two or more springs 10, which thrust against the housing 7 and press the switching disc 9 against the flanges 8. Adjustment screws 12 are inserted in the flanges 8 beneath the microswitches 11, by means of which the microswtiches 11 can be adjusted.

As soon as the torch 14 strikes against one of the sides of the weld 2, 3, by the loose mounting of the switching disc 9 on the flanges 8 it is deflected about a pivot point 13 lying on the lengthwise axis 14. The switching disc 9 is cocked relative to the flanges 8, so that one or both of the microswitches 11 is always interrupted. This switch signal causes a saving of the coordinates of the point of contact in the path control. To facilitate the flipping action, the switching disc 9 is spherically rounded at its periphery about the pivot point 13. Once the welding torch 4 has moved back, the springs 10 press the switching disc 9 against the flanges 8 and all microswitches 11 are again closed.

What is claimed is:

1. A process for seeking and following an area running along a region of abutting elements to be joined, at a predetermined angle with respect to each other, by a fillet weld, comprising the steps of:
   positioning a welding torch at a preprogrammed search point between the elements to be joined;
   moving the welding torch in the direction of a first of the elements to be joined until the torch comes into mechanical contact with the first element at a first point of contact;
   sensing the mechanical contact between the torch and the first element at the first point of contact and saving the three-dimensional location of the first point of contact as a first data value;
   subsequent to moving the welding torch to the first point of contact, moving the welding torch in the direction of a second of the elements to be joined until the torch comes into mechanical contact with the second element at a second point of contact;
   sensing the mechanical contact between the torch and the second element at the second point of contact and saving a three-dimensional location of the second point of contact as a second data value;
   determining a reference point corresponding to the intersection of the first and second elements based on the predetermined angle between the first and second elements and based on the first and second data values and determining a welding path for the torch to follow during a welding process, the welding path overlying the area to be welded, said path being based on the determined reference point.

2. A process according to claim 1, further comprising:
   positioning the welding torch at a second preprogrammed search point between the elements to be joined, said second search point being spaced a distance from the preprogrammed search point along the area to be welded;
   moving the welding torch in the direction of the first element until the torch comes into mechanical contact with the first element at a third point of contact;
   sensing the mechanical contact between the torch and the first element at the third point of contact and saving the three-dimensional location of the third point of contact as a third data value;
   subsequent to moving the welding torch to the first point of contact, moving the welding torch in the direction of the second element until the torch comes into mechanical contact with the second element at a fourth point of contact;
   sensing the mechanical contact between the torch and the second element at the fourth point of contact and saving the three-dimensional location of the fourth of contact as a fourth data value;
   determining a second reference point corresponding to the intersection of the first and second side based on the predetermined angle between the first and second elements and based on the third and fourth data values and determining a welding path based on the reference point and the second reference point.

3. A process for seeking and following an area to be welded according to claim 1, wherein said step of moving the welding torch includes moving the welding torch from the preprogrammed search point to the first element to be joined along a path lying at a right angle to a slope of the first element and said step of moving the welding torch from the first point of contact in the direction of the second element includes moving the welding torch from the first point of contact to the preprogrammed seach point and moving the welding torch from the preprogrammed search point in the direction of the second element along a path lying at a right angle to a slope of the second element.

4. A process according to claim 1, further comprising: positioning the welding torch at a second preprogrammed search point between the elements to be joined, said second search point being spaced a distance from the preprogrammed search point along the area to be welded;
   moving the welding torch in the direction of the first element until the torch comes into mechanical contact with the first element at a third point of contact;
   sensing the mechanical contact between the torch and the first element at the third point of contact and saving the three-dimensional location of the third point of contact as a third data value;
   moving the welding torch from the first point of contact in the direction of the second element until the torch comes into mechanical contact with the second element at a fourth point of contact;
   sensing the mechanical contact between the torch and the second element at the fourth point of contact and saving the three-dimensional location of the fourth point of contact as a fourth data value;
   determining a second reference point corresponding to the intersection of the first and second side based on the predetermined angle between the first and second elements and based on the third and fourth data values and determining a welding path based on the reference point and the second reference point; and wherein said step of moving the welding torch includes moving the welding torch from the preprogrammed search point to the first element to be joined along a path lying at a right angle to a slope of the first element and said step of moving the welding torch from the first point of contact in the direction of the second element includes moving the welding torch from the first point of contact to the preprogrammed search point and moving the welding torch from the preprogrammed search point in the direction of the second element along a path lying at a right angle to a slop of the second element.

5. A process according to claim 1, further comprising forming a weld with said torch following the weld path by inert gas arc welding with carbon dioxide inert gas and adjusting the distance between the torch and the intersection of the first and second sides based on the magnitude of the welding current wherein the length of the welding arc is a function of the welding current.

6. A process according to claim 1, further comprising: subsequent to moving said welding torch to the first point of contact and prior to moving the welding torch in the direction of a second of the elements to be joined, returning the welding torch to said preprogrammed search point.

7. A welding arrangement comprising:
   a housing mounted on a manipulator, said housing including an inwardly directed flange support portion;
   a pair of adjustment contact members supported by said flange portion;
   a disc member supporting a welding torch, said disc member mounted on said flange portion, said disc member having a pair of sensor contact portions, each sensor contact portion being engageable with a corresponding one of said pair of adjustment contact members; and
   means biasing said disc member to a central position in which said switch members of said disc are in contact with said adjustable contact members and said welding torch is positioned with an end extending outwardly of said housing.

8. A device according to claim 7, wherein torch height control means are provided associated with said manipulator for controlling the height of the torch above an area to be welded, said torch control means including means for measuring the welding current, wherein said welding current provides an indication of the length of a shielded weld arc formed between said torch and said area to be welded.

9. A process for the detection and following of a fillet weld during inert gas arc welding, and in particular welding with carbon dioxide inert gas by means of a welding torch moved by a path controlled manipulator, comprising determining coordinates of one or several seam reference points of a seam formed by a first and second element to be joined by welding; storing the seam reference points guiding a welding torch along a path defined by the seam reference points and adjusting a vertical distance of the torch to the area to be welded in dependence upon welding current measured during welding, said reference points each being determined by moving a torch in the direction of the elements to be joined by welding, sensing mechanical contact between the torch and the element to be welded and determining a reference point based on the sensed mechanical contact point and the angle of the elements to be welded.

* * * * *